United States Patent
Pinkston (10) Patent No.: US 7,258,100 B2
(45) Date of Patent: Aug. 21, 2007

(54) INTERNAL COMBUSTION ENGINE CONTROL

(76) Inventor: Bruce Pinkston, 20306 Hickory Wind Dr., Humble, TX (US) 77346

( * ) Notice: Subject to any disclaimer, the term of this patent is extended or adjusted under 35 U.S.C. 154(b) by 0 days.

(21) Appl. No.: 10/910,509

(22) Filed: Aug. 3, 2004

(65) Prior Publication Data

US 2006/0027208 A1    Feb. 9, 2006

(51) Int. Cl.
- F02D 13/02 (2006.01)
- F01L 1/34 (2006.01)
- F02B 15/00 (2006.01)
- F02M 25/10 (2006.01)

(52) U.S. Cl. .............. 123/316; 123/432; 123/90.16

(58) Field of Classification Search .......... 123/295, 123/305, 316, 432, 90.15–90.18, 347, 348, 123/403
See application file for complete search history.

(56) References Cited

U.S. PATENT DOCUMENTS

| | | | | |
|---|---|---|---|---|
| 2,344,993 | A * | 3/1944 | Lysholm | 123/316 |
| 4,862,841 | A * | 9/1989 | Stevenson | 123/316 |
| 4,958,606 | A * | 9/1990 | Hitomi et al. | 123/316 |
| 5,203,291 | A | 4/1993 | Suga et al. | 123/90.17 |
| 6,405,696 | B1 | 6/2002 | Borraccia et al. | 123/90.17 |
| 6,502,536 | B2 | 1/2003 | Lee et al. | 123/90.16 |
| 6,600,989 | B2 | 7/2003 | Sellnau et al. | 701/110 |
| 6,604,497 | B2 | 8/2003 | Buehrle, II et al. | 123/90.12 |
| 6,615,798 | B2 * | 9/2003 | Orton | 123/432 |
| 6,622,677 | B2 | 9/2003 | Simpson et al. | 123/90.15 |
| 6,651,618 | B1 * | 11/2003 | Coleman et al. | 123/305 |
| 6,655,361 | B2 | 12/2003 | Shimizu | 123/90.15 |
| 6,656,089 | B2 | 12/2003 | Furukawa | 123/90.15 |
| 6,688,280 | B2 * | 2/2004 | Weber et al. | 123/305 |
| 6,799,552 | B2 * | 10/2004 | Crowell et al. | 123/316 |
| 6,951,211 | B2 * | 10/2005 | Bryant | 123/316 |

OTHER PUBLICATIONS

GM Tech Link; Nov. 2002, vol. 3, No. 11, "Cam Phasing Technology", pp. 1-8.
www.delphi.com; Engine Management, "Variable Cam Phaser (VCP) Helical Spline".
www.autospeed.com; "Variable Valve Timing", Julian Edgar, 4 Pgs.

* cited by examiner

Primary Examiner—Willis R. Wolfe, Jr.
(74) Attorney, Agent, or Firm—Patrick K. Steele; Streets & Steele (57) ABSTRACT

A method for controlling the output of an internal combustion engine includes opening an intake valve on a cylinder; receiving air from an intake manifold into the cylinder during an intake stroke of a piston in the cylinder; returning excess air from the cylinder back into the intake manifold during the initial portion of the compression stroke of the piston, wherein a quantity of combustion air or air/fuel mixture necessary for a desired engine power output remains in the cylinder; and then closing the intake valve. A control device includes a control camshaft rotatively coupled to the crankshaft having a control cam with lobes that engage the intake valves for holding one or more intake valves open; a cam phaser to vary the phase of the controlled cam relative to the main camshaft; and a cam phase controller linked to the cam phaser, wherein advancing the phase of the control cam increases the power output of the internal combustion engine.

42 Claims, 7 Drawing Sheets

INTERNAL COMBUSTION ENGINE CONTROL

BACKGROUND OF THE INVENTION

1. Field of the Invention

This invention relates generally to four-stroke spark ignition internal combustion engines and more particularly, to methods and devices for efficiently controlling the power output of a spark ignition internal combustion engine.

2. Description of the Related Art

In a four-stroke internal combustion engine, a single cycle of operation occurs over four strokes of a piston within its cylinder, made during two crankshaft revolutions. Engines having more than one cylinder generally evenly stagger the cycles of the cylinders for smooth operation, with each cylinder completing the four-stroke cycle within two consecutive engine revolutions.

The four strokes of the piston that occur in a single cycle of operation are the intake, compression, power and exhaust strokes. Generally, at the beginning of the intake stroke when the piston is at or near the top of the cylinder, the intake valve opens and the descending piston draws air into the cylinder. The position of the piston at the top of its movement toward the valves is called top dead center (TDC). At or near the bottom or end of the intake stroke, the intake valve closes. The position of the piston at the bottom of its movement away from the valves is called bottom dead center (BDC). From this position, and with the intake and exhaust valves closed, the piston starts upward on its compression stroke until it reaches TDC. The piston compresses the air or air-fuel mixture captured within the cylinder upon closure of the intake valve into a small space at the top of the cylinder and adjacent to the valves. Usually just before the piston reaches TDC on its compression stroke, the spark plug fires to ignite the air-fuel mixture, causing the mixture to burn quickly. The rapidly expanding gases of the burning mixture force the piston down and away from the valves on its power stroke. As the piston reaches the bottom of the power stroke (BDC), the exhaust valve opens for the exhaust stroke of the piston. During the exhaust stroke, the piston moves back toward TDC and forces the combustion products, mainly carbon dioxide, carbon monoxide, nitrogen oxides, and some unburned hydrocarbons, out of the cylinder through the exhaust valve and into the exhaust manifold.

The intake valves and exhaust valves are typically operated by cam lobes on one or more camshafts. The valves are generally spring-biased toward their closed or seated positions. As known in the art, a simple engine may have one camshaft with multiple cam lobes that operate both the intake and exhaust valves, while more complex engines may have multiple camshafts that can operate more valves per cylinder, such as, for example, a double overhead cam arrangement in a four-valve-per-cylinder engine. A cam lobe is rotated by a camshaft to apply force to the top of the valve stem, either directly or through a rocker arm, and operates the valve to open and close as the camshaft rotates. The camshaft rotates in a phased relationship with the crankshaft of the engine, usually through a belt, chain or gears, and is synchronized with the crankshaft so that the valves open and close at the proper times during the engine's cycle. Typically the camshaft is designed to turn at one-half the angular speed of the crankshaft.

Parasitic losses occur throughout an internal combustion engine and are caused, for example, by friction, valve operation, exhaust backpressure and the throttling of intake air across the throttle valve. Such losses decrease the fuel efficiency of the engine, thereby increasing fuel consumption and exhaust emissions that result from the increased fuel consumption. The automobile industry has developed many useful solutions to reduce these parasitic losses, but there still exists an ongoing need to improve engine efficiency and to further reduce losses.

One industry solution to the problem of parasitic losses has been the implementation of optimized camshaft profiles and valve timing. When an engine is operating at low speed, such as when idling, the optimal camshaft profile is close to the "theoretically normal" intake valve opening and closing points, i.e., 0 degrees after top dead center (ATDC) and 180 degrees ATDC on the intake cycle. Such camshaft and valve timing may be considered "slow speed" or "conservative" and results in a steady, smooth, and strong idle.

However, at high engine speeds, usually above 2000 rpm, the optimal intake valve opening time is earlier, for example, 15 degrees before top dead center (BTDC), and the optimal intake valve closing time is later, for example, 220 degrees ATDC. A "high speed" cam profile providing this valve timing maximizes the quantity of air captured within the cylinder and provides more torque and power at high rpm, but also cause rough idling and increased exhaust emissions at low speed.

To optimize an engine's performance both at high and low speeds, systems have been developed that vary the timing of the opening and/or closing of the valves relative to the angular position of the crankshaft by advancing or retarding the valve timing. Other systems have been developed that vary the length of time that the intake valves remain open. Such methods may be implemented separately or jointly.

For example, in U.S. Pat. No. 6,502,536 issued to Lee, et al., which is fully incorporated by reference, a two-step roller finger follower is disclosed that provides for selecting between two separate, fixed cam profiles. Switching between different cam profiles enables a selection of a high lift/long duration or a low lift/short duration operation of an intake valve. Lee discloses that for efficient low-speed operation of the engine, the low lift and short duration cam profile for the intake valves is implemented, and at high speed, the high lift and long duration cam profile for the intake valves is implemented. Lee further discloses that the angular position of the camshaft relative to that of the crankshaft may be varied. Such camshaft control is known as cam phasing.

Cam phasing varies the timing of the opening and/or closing of the valves relative to the angular position of the crankshaft by advancing or retarding the valve timing. Cam phasing may be used to control intake and exhaust valve overlap as a function of engine speed and provides a finer control of the engine's operation by modifying the mechanical linkage between the camshaft and the crankshaft to modify the intake valve profile. Valve overlap refers to the condition in the four-cycle engine when both the intake and the exhaust valves are open at the same time. At idle and low engine load, overlap is at its minimum to improve idle quality, while at higher engine speed and greater load, the overlap is increased to provide higher power. Cam phasing technology can be used to control the overlap event by shifting both the intake valve profile and the exhaust valve profile, one relative to the other, and both relative to the crankshaft.

In U.S. Pat. No. 6,600,989 issued to Sellnau, et al., which is hereby fully incorporated by reference, a method for early intake valve closing (EIVC) is disclosed. Sellnau discloses an intake valve cam phaser that enables optimization of the timing of the intake valve relative to the engine crankshaft. The cam phaser enables the opening and closing of the intake valves to be controlled relative to the rotational position of the crankshaft. Sellnau discloses an EIVC system and method utilizing a two-step cam profile switching device and an intake valve cam phaser to achieve variability in the intake valve lift profile of an internal combustion engine in response to engine operating parameters. Sellnau's EIVC systems shift the entire intake valve profile so that the intake valve closes earlier than it would otherwise close relative to the piston motion; that is, when the engine is in EIVC mode, the intake valves may close before the pistons reach BDC. According to Sellnau, early closing of an intake valve reduces the amount of air and fuel in the cylinder to satisfy the decreased power demand. Sellnau discloses that reducing the amount of fuel used increases engine efficiency and decreases emissions as compared to conventional intake valve operation.

There are many different cam phasers known in the art. For example, U.S. Pat. No. 6,622,677 issued to Simpson, et al., which is fully incorporated by reference, discloses a cam phaser for adjusting the angular relationship between a camshaft and a crankshaft. Simpson discloses a cam phaser having a worm gear mounted on an inner housing meshed with the internal teeth of an outer housing. The inner housing is connected to the camshaft. The worm gear is connected to one or two drive wheels, which are rotated by contact with stationary plates. The plates are moved by electromagnetic coils to contact the drive wheel or wheels, and turn them in one direction of the other.

Another cam phaser disclosed in U.S. Pat. No. 5,203,291 issued to Suga, et al., which is fully incorporated by reference, shows an outer housing containing internal gear teeth, which are turned by small gears. The small gears are driven by a pin on the spiral cam, which is in turn disposed on the gear shaft. A pair of stopper pins is also present to restrict the rotation of the gear when necessary.

While these valve phasing techniques may optimize the timing of valves to the power demand of the engine, they do little to address one of the largest parasitic losses that robs the engine of power and efficiency, especially at low engine speeds. Even cam phasing methods designed to optimize valve operation at low engine speeds do nothing to alleviate power losses attributable to the throttling of intake air across the throttle valve. In conventional spark ignition internal combustion engines, control of engine power and speed is obtained by throttling the intake air to the cylinders using a throttle valve, which is typically a butterfly valve. The accelerator is linked to the throttle valve to control the amount of combustion air that enters the engine cylinders through the intake valves. Engine power output is increased by pushing on the accelerator and opening the throttle valve to allow more air to enter the cylinders, and increased air can be used to burn more fuel per combustion event.

The operation of the throttle valve and the pumping action of the pistons create a vacuum in the intake manifold. When the throttle valve partially closes, a pressure drop is imposed on the air flowing into the intake manifold and across the throttle valve. The vacuum created in the intake manifold limits the amount of air that can be drawn into a cylinder during the intake stroke of the piston, thereby limiting the amount of fuel that can be burned to drive the piston on its power stroke. As the throttle valve closes, the vacuum in the intake manifold increases, and as the throttle valve opens, the vacuum decreases. As used herein, a pressure stated in terms of inches of Hg means absolute pressure unless otherwise stated. A typical vacuum in the intake manifold of an internal combustion engine at mid-range speed is between about 16 to 22 inches of Hg (8 to 14 inches Hg below ambient at sea level).

Using a throttle valve to control the engine speed while generating a vacuum is inefficient and costly because the resulting vacuum wastes power and energy. While the vacuum enables power control by controlling the air charge introduced into each cylinder on the intake stroke, the vacuum also retards the crankshaft rotation by resisting piston movement during its intake stroke. This parasitic power loss is most severe at low engine speed.

The vacuum generated in the intake manifold reduces the power output of the engine because less fuel is being burned and because the engine is forced to produce substantial amounts of vacuum whenever the throttle valve is not wide open. The energy cost of producing this vacuum is approximately equal to the cost of producing an equal volume of compressed air at the same flow rate and at the same differential pressure relative to ambient. Power availability is diminished as a result of the produced vacuum.

What is needed is a method for controlling an internal combustion engine that reduces the parasitic loss resulting from the vacuum generated by pulling the intake air across the throttle valve. Furthermore, an internal combustion engine configuration is needed on which such a method may be implemented.

SUMMARY OF THE INVENTION

The present invention provides a method and apparatus for efficiently controlling an internal combustion engine without the use of a throttle valve. A portion of the air or air/fuel charge originally introduced into the cylinder is returned to the intake manifold before closure of the intake valve(s) to provide a smaller combustible charge.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

Figure 1:
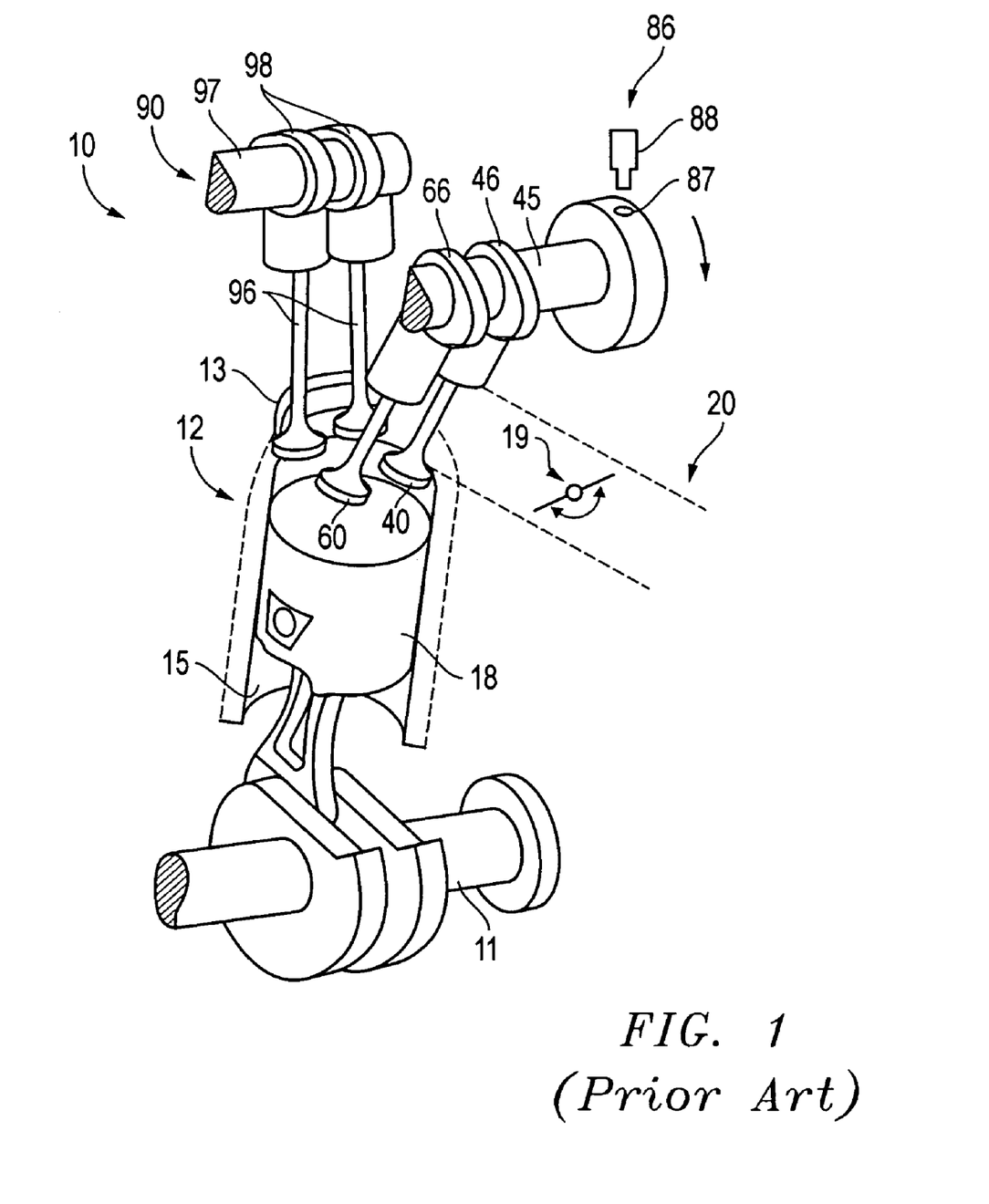
FIG. 1 is a partially cutaway perspective view of a typical four-stroke internal combustion engine having four valves per cylinder.

The present invention provides a method and an apparatus for controlling the power output of a typical internal combustion engine. FIG. 1 is a partially cutaway perspective view of a typical four-stroke internal combustion engine. The internal combustion engine 10 generally includes a cylinder 12 having a head 13 and a cylinder sidewall 15 with a piston 18 within the cylinder 12. During operation of the engine, the piston 18 reciprocates within the cylinder 12 in repeating cycles of four strokes: the intake stroke, the compression stroke, the power stroke and the exhaust stroke. The piston 18 is coupled to the crankshaft 11. Although only one cylinder 12 is shown, a typical internal combustion (IC) engine 10 may include a plurality of cylinders, usually four or more. However, the present invention can be applied to IC engines having any number of cylinders, although engines having three or fewer cylinders may be further improved with certain modifications, as will be described in more detail, in order to achieve the advantages available through the use of this invention.

For purposed of this disclosure, the terms "intake manifold" and "air supply" are used interchangeably. Included within the scope of these interchangeable terms are a branching duct structure for receiving and distributing filtered air to a plurality of cylinders and a duct structure dedicated to supplying air to a single cylinder. Referring to FIG. 1, an air supply system 20 includes a camshaft 45 that further includes cam lobes 46, 66 that rotate with the camshaft 45 to open and close the intake valves 40, 60, respectively, in the cylinder head 13. An exhaust system 90 includes a camshaft 97 that further include cam lobes 98 that rotate with the camshaft 97 to open and close the exhaust valves 96 in the cylinder head 13. Belts, chains or gears (not shown) rotatively couple the crankshaft 11 to the camshafts 45, 97 and rotate the camshafts 45, 97 to ensure that the camshafts 45, 97 and the crankshaft 11 are synchronized, although the camshafts 45, 97 rotate at one-half the angular speed of the crankshaft 11.

An engine speed sensor 86 includes means for sensing engine position, such as a magnetic implant 87 in the camshaft 45 and a magnetic sensor 88 for detecting passage of the implant 87 and for sending a signal to another electronic device, such as a computer (not shown). Other engine speed indicators are also known in the art, such as one for sensing spark plug firings.

In the typical IC engine shown in FIG. 1, the air supply system 20 further includes a throttle valve 19 that is coupled to and controlled by an accelerator pedal (not shown) by means well known in the art. The throttle valve 19 opens as the accelerator pedal is pushed, allowing more air to flow through the intake valves 40, 60 and into the cylinder 12, and thereby increasing the power output of the engine 10.

The pressure drop of the air flow across the throttle valve 19 is a large parasitic loss designed into IC engines. The present invention provides methods and devices for controlling the power output of the engine without the use of a throttle valve and without the parasitic loss caused by the throttle valve.

One embodiment of the present invention provides a method that controls the power output of an IC engine without reducing the pressure of the intake air and, therefore, without creating a substantial vacuum in the intake manifold. Instead, control of engine power output is achieved by holding one or more intake valves on a cylinder open for an extended duration beyond the intake stroke and continuing into the early portion of the compression stroke of the piston so that a portion of the air or air/fuel mixture is returned from the cylinder back into the intake manifold through the one or more open intake valves. The method includes the steps of opening the one or more intake valves on the cylinder and receiving air from the intake manifold into the cylinder during the intake stroke of the piston. Since no throttle valve controls the volume of air that enters the cylinder, the cylinder fills with air at or near ambient pressure. During the compression stroke of the piston, the method includes the step of returning a portion of the air from the cylinder back into the intake manifold so that only the desired quantity of combustion air necessary for a desired power output remains in the cylinder upon closing of all the intake valves. The one or more intake valves close and the compression stroke is completed as the piston compresses the combustion air and fuel in the cylinder in preparation for the power stroke.

It will be appreciated by those skilled in the art that the present invention is easily adapted for application to typical IC engines where holding one or more intake valves open during the initial portion of the compression stroke will result in the expulsion of air or air/fuel mixture back into the intake manifold. However, persons skilled in the art will also appreciate that the present invention includes within its scope a method and an apparatus in which the air in a cylinder is forced by the moving piston back through the intake valve(s) and into a chamber or structure other than the intake manifold from which the air was originally received. Such a configuration might require additional valving and/or flow control. Also, in such a configuration, air would be expelled from the cylinder directly to a chamber or other structure instead of being returned to the intake manifold. This configuration may be useful for adapting the present invention for application to an engine having few cylinders.

Since a throttle valve is not used to control the air flow into the cylinder during the intake stroke, the pressure in the intake manifold approximates the ambient pressure and the parasitic vacuum loss is substantially eliminated. Instead of a pressure of 16 to 22 inches of Hg (absolute) typically found in an intake manifold having a throttle valve, the pressure in the intake manifold of an engine using the present invention is generally about 29 inches of Hg (absolute), and is potentially between about 29.5 inches of Hg (absolute) and ambient atmospheric pressure (at sea level). The only pressure drop imposed on the intake air is the small flow pressure losses across the air filter and other components of the air supply system. The present invention is also useful for supercharged internal combustion engines operating with intake manifolds above atmospheric pressure.

Fuel is added to the combustion air using the same methods and devices as found in the typical internal combustion engine. Fuel must be mixed with the combustion air for ignition near the conclusion of the compression stroke of the piston. Fuel is generally introduced using a carburetor or fuel injectors, as is well known in the art. Since fuel may be added to the air during the intake stroke of the piston, some fuel may also be expelled with that portion of the air that is returned to the intake manifold during the compression stroke. However, this expelled or returned air and fuel is temporarily stored in the intake manifold (or other structure) for later use during a subsequent intake event when the one or more intake valves again open to fill a cylinder with air from the intake manifold during the intake stroke of a piston. Generally, the heat added to the portion of the air or air/fuel mixture that is returned to the intake manifold will prevent unwanted fuel condensation in the portion of the air or air/fuel mixture that is temporarily returned to the intake manifold.

Since the present invention provides that air and fuel return to the intake manifold through the one or more open intake valves during the compression stroke of the piston, the power output from the IC engine must decrease as the duration of the intake valves remaining open is extended. One embodiment of the present invention further includes the step of changing a duration between the step of opening and the step of closing the one or more intake valves for obtaining the desired power output. For maximum engine power, intake valves close at or very soon after the start of the compression stroke to minimize or prevent any air or air/fuel mixture from being expelled back into the intake manifold. The present invention is designed to have minimal or no effect on the operation of the engine at maximum power output. For idling conditions, or minimum engine power, the one or more intake valves in an engine adapted to use the present invention remain open for the maximum duration, returning most of the air or air/fuel mixture back to the intake manifold so that only enough air or air/fuel mixture remains in the cylinder to prevent the engine from stalling. The power generated by the internal combustion engine is controlled, therefore, by returning a substantial portion of the air that was received into the cylinder during the intake stroke back to the intake manifold. In operation, increasing the quantity of received air that is returned back to the intake manifold results in decreasing the power that is generated by the internal combustion engine. The substantial portion of air returned back to the intake manifold in accordance with the present invention may vary, but is at least about 5 vol. % of the received air, more preferably at least about 10 vol. % of the received air, and most preferably above 15 vol. % of the received air. Preferably, no more than about 95 vol. % of the received air is returned back to the intake manifold, though more than 95 vol. % can be returned if the engine can idle on a lesser amount of retained air. Factors that affect amount of air that is returned to the intake manifold include, for example, power demand, atmospheric pressure, temperature, fuel specific heat and temperature, and cam lobe configurations.

Therefore, the more power output desired from the engine, the shorter the time interval that the one or more intake valves remain open during the compression stroke. To change the duration of the time interval during which the one or more intake valves remain open, an embodiment of the present invention further includes operatively employing a control camshaft to modify the effective net intake cam profile, wherein the control camshaft comprises a control cam for holding the one or more intake valves open beyond the angle at which the main camshaft would otherwise allow the one or more intake valves to close.

The present invention further provides an apparatus for implementing the methods for controlling the power output of an IC engine. The apparatus includes a means for extending the duration during which an intake valve on an IC engine is held open so that excess air or air/fuel mixture may be returned from the cylinder back into the intake manifold during a portion of the combustion stroke.

In a preferred embodiment of the present invention, a lobe on a control camshaft engages the intake valve, either directly or through a mechanism such as a rocker arm, and holds the intake valve open for an extended duration during which the excess air or air/fuel mixture is expelled from the cylinder back into the intake manifold. Typically, the cam lobes on the one or more camshafts of a typical IC engine rotate to open intake valves and hold them open while the air or an air/fuel mixture is received into the cylinders during the intake stroke of the pistons. By adding a control camshaft to the IC engine, the present invention provides a means for holding an intake valve open for an extended duration during which excess air and fuel not necessary for power production is returned from the cylinder back into the intake manifold.

The control camshaft is rotatively coupled to the crankshaft by a belt, a chain or by gears in a manner similar to the main camshaft's coupling to the crankshaft. For most modern IC engines, fuel is introduced into the cylinder using fuel injection, and the amount of fuel injected into each cylinder is determined and controlled using sensors that measure the engine load and speed, the amount of the air charge in the cylinder and other related engine parameters. These same systems can be easily adapted in accordance with the present invention to measure the fuel content of the air charge in the cylinder, to compute the amount of additional fuel needed to facilitate a combustion event that prevents engine stalling, and to instruct the fuel injection system to inject this amount of fuel into the cylinder. Generally, the amount of fuel introduced into the cylinder is determined by the stoichometric air to fuel ratio. Alternately, the control camshaft may be rotatively coupled to the main camshaft which is, in turn, rotatively coupled to the crankshaft. The main camshaft and the control camshaft both turn at the same angular speed, which is typically one-half the angular speed of the crankshaft. Therefore, for each four-stroke cycle of the engine, the crankshaft makes two full revolutions as each of the camshafts (the main camshaft and the control camshaft) make only one revolution.

The control camshaft and the main camshaft may both engage the same intake valve on a given cylinder. Alternatively, on IC engines having more than one intake valves per cylinder, the control camshaft may engage one or more control intake valves and the main camshaft may engage one or more main intake valves on a given cylinder. If a cylinder has more than one intake valve, for example two valves, one of the intake valves may be operated by a cam lobe on the control camshaft and the other valve may be operated by a cam lobe on the main camshaft. Whatever relationship is chosen for operating the one or more intake valves for the cylinder, the cam lobes on the control camshaft hold one or more intake valves open for the duration of the period during which the excess portion of the air or air/fuel mixture is returned back into the intake manifold during the compression stroke of the piston.

Cam phasers are well known in the art and are used to adjust the rotational relationship of cams to the crankshaft for adjusting the valve timing. Any of the cam phasers known to those having ordinary skill in the art may be used to control the phase angle of the control camshaft of the present invention. Cam phasers are available that are operated by hydraulic, electrical or mechanical arrangements. To extend the duration during which one or more intake valves are held open, a cam phaser retards the angular position of the control camshaft relative to the main camshaft (and, therefore, relative to the crankshaft).

The cam phaser operatively engages the control camshaft to retard the phase of the control camshaft between about 0 degrees and about 90 degrees of control camshaft angle (0 to 180 degrees of crankshaft angle) relative to the main camshaft. A cam phaser is a device that intercedes between the elements of a rotating drive train such that the output element can be adjusted in angular position relative to an input element. The cam phaser used in the present invention generally comprises a structural coupling between the control camshaft and either the main camshaft or the crankshaft. It should be noted that coupling the control camshaft to the main camshaft is an indirect coupling of the control camshaft to the crankshaft because the main camshaft is rotatively coupled to the crankshaft. The cam phaser further comprises a means to control and manipulate the cam phaser coupling to rotatively advance or retard the control camshaft relative to the engine crankshaft. The cam phaser also comprises a means to reverse the change in cam phaser position and thereby restore the engine to full power mode.

At full power output, the control camshaft is advanced by the cam phaser to 0 degrees camshaft angle relative to the main camshaft so that the cam on the control camshaft does not extend the opening of the intake valve beyond the duration determined by the main camshaft. At this full power position, the intake valve closes soon after the beginning of the compression stroke in order to prevent any of the air or air/fuel mixture in the cylinder from being expelled back into the intake manifold. To decrease the power output of the IC engine, the control camshaft is retarded by the cam phaser so that the control cam, acting in concert with but in a controllably delayed relationship with the main camshaft, engages and holds the intake valve open for a duration longer than the duration provided by the main camshaft (except at full engine power), thereby allowing a portion of the air or air/fuel mixture to be returned back into the intake manifold during a portion of the compression stroke of the piston.

An embodiment of the present invention further includes a cam phase controller linked to the cam phaser. The cam phase controller causes the cam phaser to advance the phase of the control cam when an increase in engine power is demanded, or to retard the phase of the control cam when a decrease in engine power is demanded. The communication between the phase controller and the cam phaser may be electrical, mechanical, hydraulic, pneumatic or a combination thereof.

In one preferred embodiment, the accelerator pedal of an IC engine may be pressed to demand additional power output from the IC engine. Linked to the cam phaser in a manner similar to the mechanical linkage that links the accelerator pedal to the throttle valve in a conventional IC engine, pressing the accelerator pedal activates the cam phaser to advance the phase of the control cam and to decrease the duration that the control cam holds the intake valve open. By releasing the accelerator pedal, a spring in the mechanical linkage pulls the linkage back, causing the cam phaser to retard the phase of the control cam and to thereby increase the duration that the control cam holds the intake valve open, returning a portion of the received air charge to the intake manifold and thereby decreasing the power output of the engine. Where the engine is operating at less than maximum power output, further releasing the accelerator pedal causes a spring to pull the linkage back even further, causing the cam phaser to further retard the phase of the control cam and to thereby further increase the duration that the control cam holds the intake valve open, returning an increased portion of the received air to the intake manifold and thereby further decrease the power output of the engine.

Figure 2A:
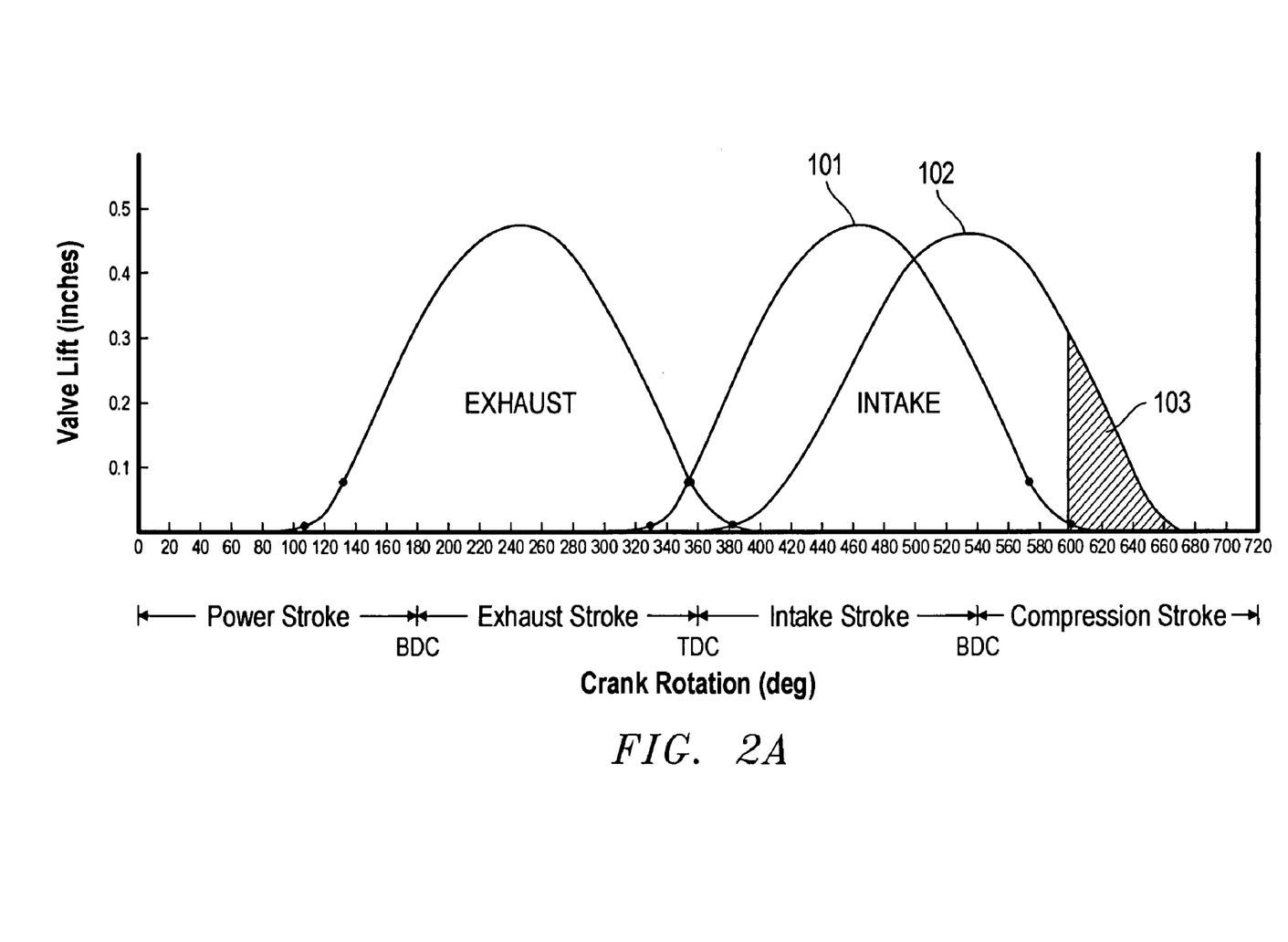
FIG. 2A is a graph of valve lift plotted against crankshaft rotation showing the opening and closing of an exhaust valve, a main intake valve and a control intake valve in accordance with the present invention.

FIG. 2A is a graph of valve lift plotted against crankshaft rotation showing the opening and closing of an exhaust valve, a main intake valve and a control intake valve in accordance with the present invention. Near the end of the exhaust stroke, the main intake valve begins to open and remains open through the beginning of the compression stroke of the piston as shown by the main intake valve lift plot 101. After the main intake valve begins to open, the control intake valve begins to open and remains open after the main intake valve has closed as shown by the control intake valve lift plot 102. During the early portion of the compression stroke of the piston, for the duration during which the main intake valve is closed and the control intake valve is open, air moves from the cylinder into the intake manifold as shown by the shaded portion 103 under the control intake valve lift plot 102.

Figure 2B:
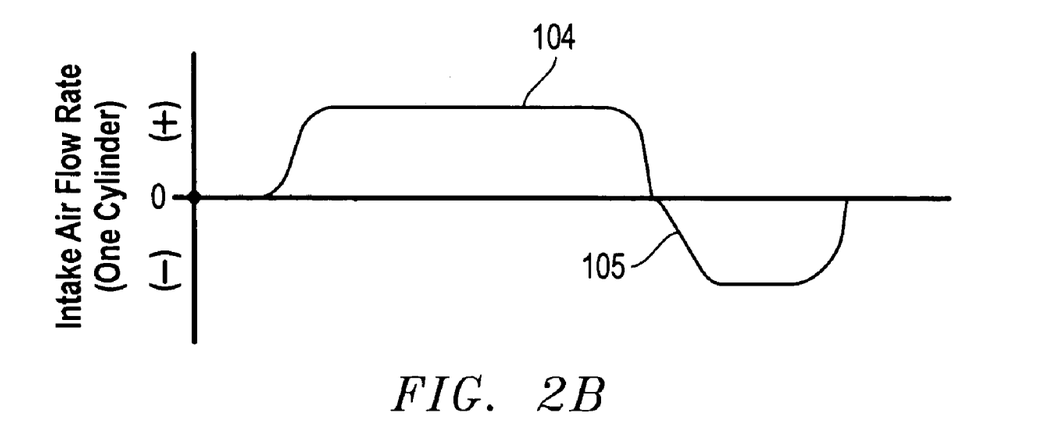
FIGS. 2B-2C are graphs showing the intake air flow rate and the mass of air remaining in a cylinder, respectively, during an engine cycle in accordance with the present invention.
Figure 2C:
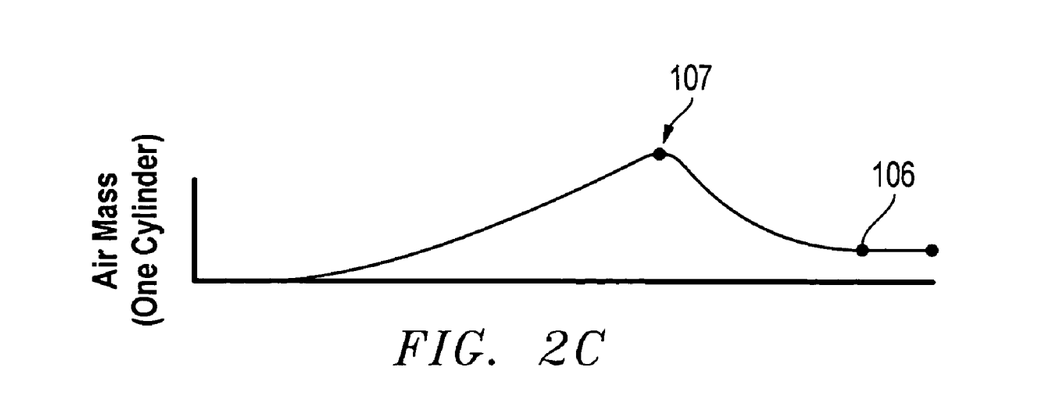

FIGS. 2B-2C, which correlate with the intake stroke and compression stroke portions of FIG. 2A, are graphs showing the intake air flow rate and the mass of air remaining in a cylinder during an engine cycle in accordance with the present invention, respectively. FIG. 2B plots the intake air flow rate 104 into the cylinder and plots the returned air flow rate 105 from the cylinder against the angular position of the crankshaft. FIG. 2C plots the total mass of air within a cylinder against the angular position of crankshaft. Just after the end of the intake stroke of the piston, the maximum amount of air 107 is contained within the cylinder. However, as the control intake valve remains open during the initial portion of the compression stroke of the piston, air returns from the cylinder back into the intake manifold, leaving the desired combustion air charge 106 within the cylinder to be compressed during the remaining portion of the compression stroke.

Figure 3A:
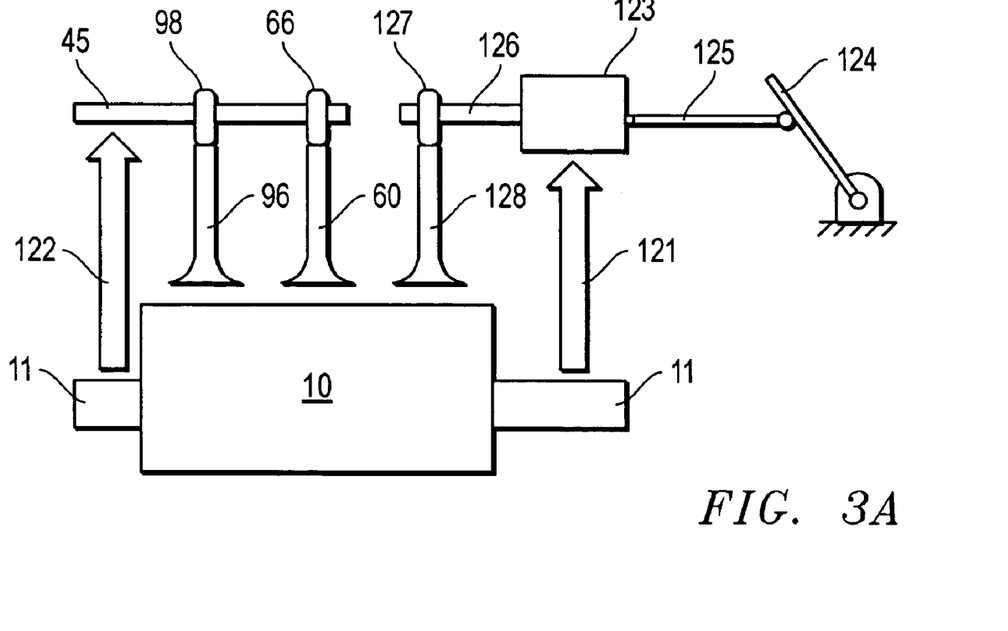
FIGS. 3A-3B are drawings showing exemplary arrangements of a control camshaft in an internal combustion engine in accordance with the present invention.
Figure 3B:
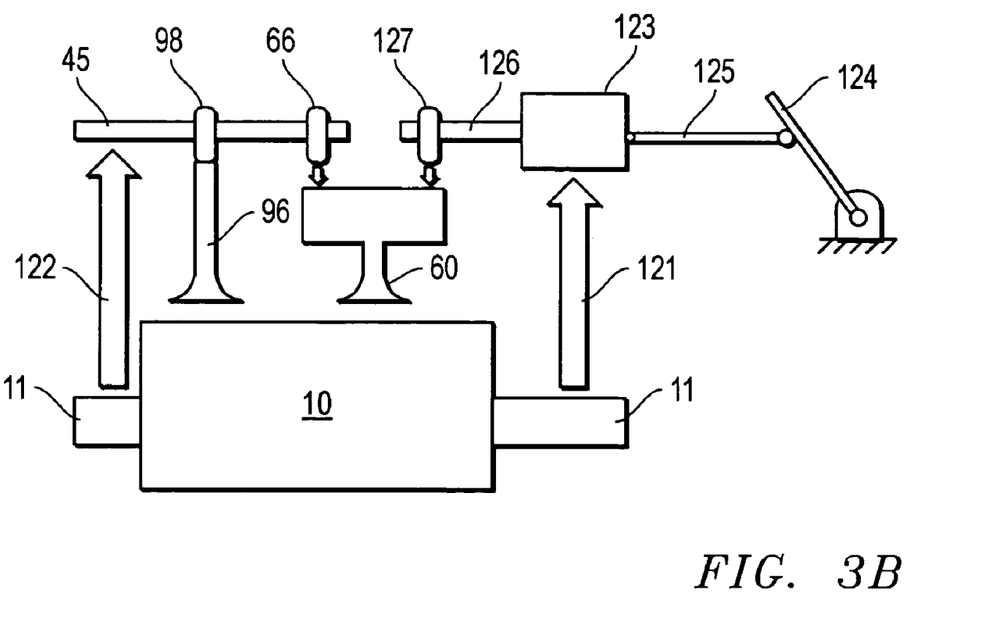

FIGS. 3A-3B are drawings showing exemplary schematic arrangements of a control camshaft on an IC engine in accordance with the present invention. FIGS. 3A and 3B both show an IC engine 10 having an intake valve 60 and an exhaust valve 96. It should be recognized that while only the valves of one cylinder are shown schematically, a typical engine has a plurality of cylinders, with each cylinder having its own set of intake and exhaust valves. Furthermore, it should be recognized that while all the figures illustrate the intake valves as being poppet valves, the present invention is useful for all known types of intake valves. A main intake cam 66 and a main exhaust cam 98 are mounted on the main camshaft 45 for opening the main intake valve 60 and the main exhaust valve 96. The main camshaft 45 is driven by the crankshaft 11 through the timing chain, belt or gear 122. A control camshaft 126 is engaged by a cam phaser 123 that adjusts the angle of rotation of the control camshaft 126 relative to the main camshaft 45. A control cam 127 is mounted on the control camshaft 126. The accelerator pedal 124 is coupled to the cam phaser 123 for indicating a demand to change the power output of the engine 10 by pressing or relaxing the accelerator pedal 124. The control camshaft 126 is driven by the crankshaft 11 through the timing chain, belt or gear 121.

One embodiment of the invention shown in FIG. 3A includes a separate control intake valve 128 that is opened and held open by the control cam 127. An embodiment of the invention shown in FIG. 3B includes only one intake valve that is opened by the main cam 66 and then may continue to be held open by the control cam 127 after the main cam 66 has rotated past the position at which, but for the engagement by the control cam 127, the main intake valve 60 would close. In the embodiment shown in FIG. 3A, the control intake valve 128 returns excess air from the cylinder back into the intake manifold while the valve is being held open by the control cam 127 after the main intake valve 60 has closed during the compression stroke of the piston. In the embodiment shown in FIG. 3B, the main intake cam 66 opens the main intake valve 60, which remains open until the control cam 127 allows the main intake valve 60 to close.

In the embodiment shown in FIG. 3A, when the cam phaser 123 maintains the angle of rotation of the control camshaft 126 at the same angle of rotation as the main camshaft 45, the main intake valve 60 and the control intake valve 128 open and close simultaneously to provide full power output by the engine 10. With both intake valves 60, 128 closing at the same time, a full charge of air is contained within the cylinder because no air is returned back into the intake manifold during the compression stroke. In the embodiment shown in FIG. 3B, when the cam phaser 123 advances the valve timing to 0 degrees by adjusting the phase of the control camshaft 126 relative to the main camshaft 45, the main intake valve 60 closes when the main cam 66 rotates away from the main intake valve 60 and no longer holds it open. Since the angle of rotation of the control cam 127 is phased with the angle of rotation of the main cam 66, the control cam 127 does not hold the intake valve 60 open any longer than does the main cam 66. With the intake valves 60 closing with a full charge of air contained with the cylinder, the engine 10 provides full power output.

However, when the cam phaser 123 retards the angle of rotation of the control camshaft 126 relative to the main camshaft 45, the power output of the engine is reduced because some of the air charge received into the cylinder is returned from the cylinder back into the intake manifold during the compression stroke of the piston. In the embodiment shown in FIG. 3A, to reduce the power output from the engine 10, the control intake valve 128 opens at a later time, but for the same angular rotation interval and duration as the main intake valve 60 so that some of the air received into the cylinder is returned to the intake manifold during the early portion of the compression stroke. In the embodiment shown in FIG. 3B, to reduce the power output from the engine 10, the control cam 127 continues to hold the intake valve 60 open after the point at which the main cam 66 rotates past and releases the intake valve 60. The control cam 127 continues to hold the intake valve 60 open for the duration set by the retarded phase of the control camshaft 126, thereby reducing the power output from the engine 10.

Figure 4:
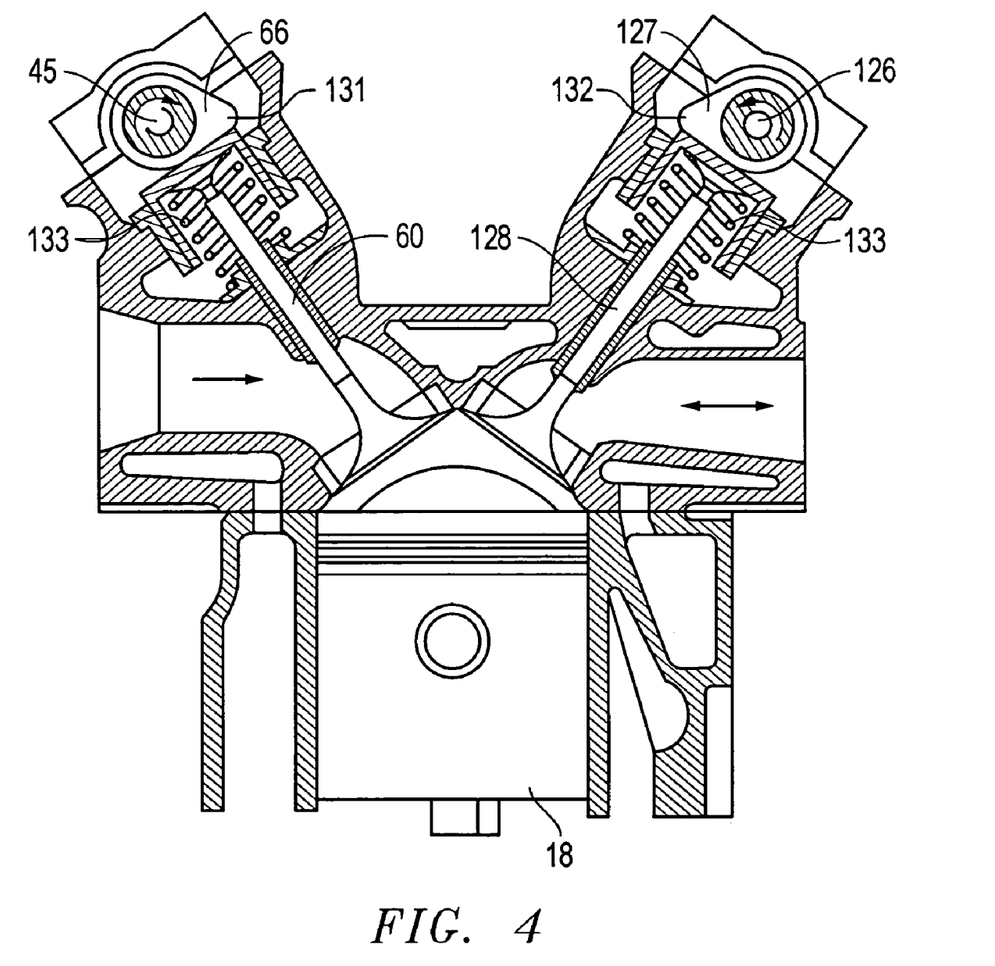
FIG. 4 is a cross-sectional view of a control camshaft arranged to open an intake valve in accordance with the present invention.

FIG. 4 is a drawing of a cross-sectional view of a control camshaft arranged to open a main intake valve in accordance with the present invention. The exhaust valve(s) is not shown for simplicity. In the embodiment of the invention shown, a control camshaft 126 is arranged to open a control intake valve 128 and a main camshaft 45 is arranged to open a main intake valve 60. The main cam 66 rotates on the main camshaft 45 and pushes the main intake valve 60 open when the cam lobe 131 rotates against the intake valve 60. Similarly, the cam lobe 132 on the control cam 127 rotates against the control intake valve 128 to push the control intake valve 128 to its open position. Both valves 60, 128 are closed by similar springs 133. When the control camshaft 126 is phased with the main camshaft 45, both intake valves 60, 128 open and close at the same time. However, when the phase of control camshaft 126 is adjusted to lag the main camshaft 45, then the control intake valve 128 remains open for a portion of the compression stroke of the piston (corresponding to 103 in FIG. 2A), thereby returning a portion of the air or air/fuel mixture from the cylinder back into the intake manifold to reduce the power output of the engine 10.

Figure 5:
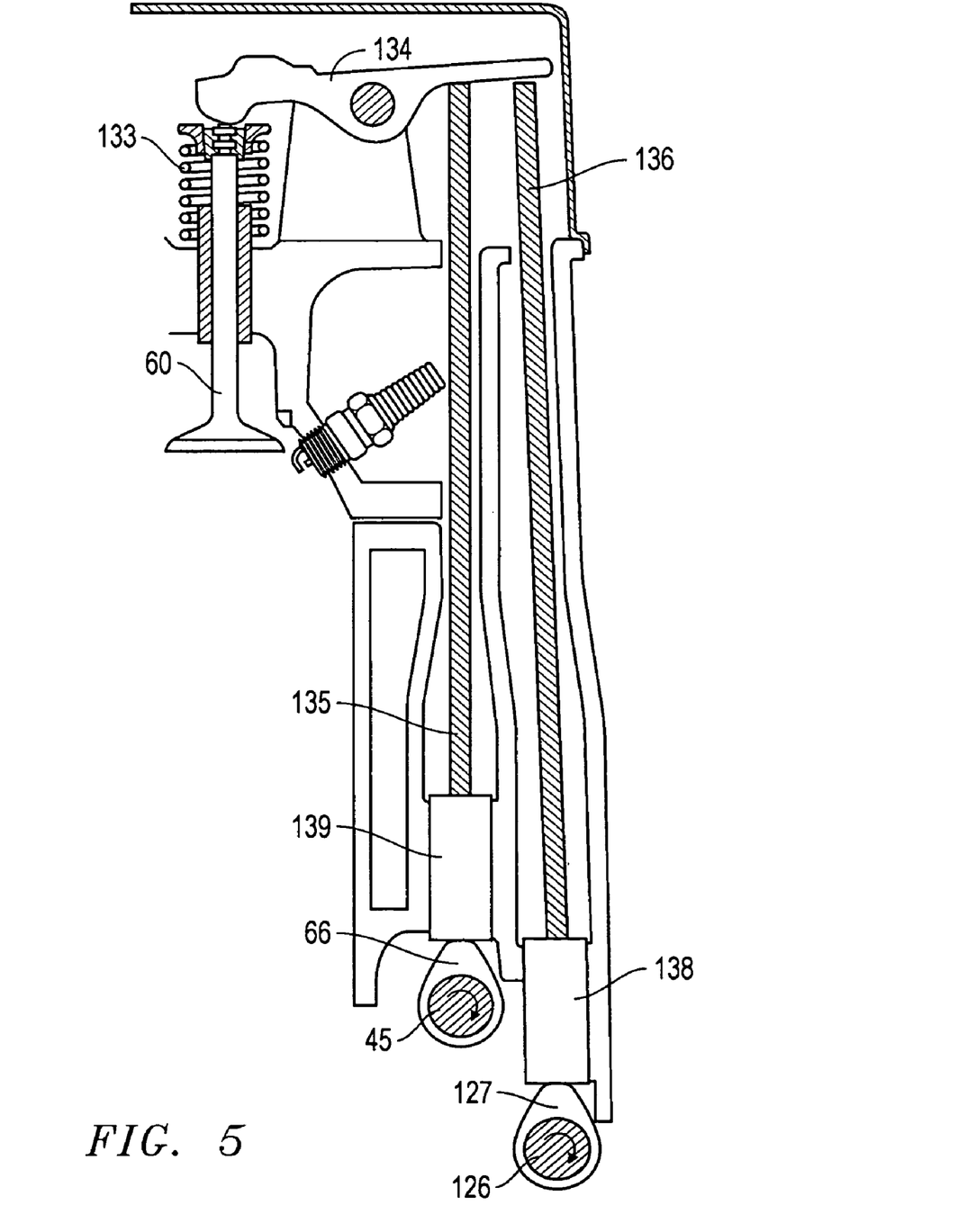
FIG. 5 is a cross-sectional view of a control camshaft arranged to extend the duration of opening of a main intake valve in accordance with the present invention.

FIG. 5 is a drawing of a cross-sectional view of an engine valve train with a control camshaft 126 arranged to open a single intake valve 60 in accordance with the present invention. The main camshaft 45 rotates and the main cam 66 engages a lifter 139 and pushes the pushrod 135 up against the rocker arm 134 to open the intake valve 60 and hold it open. A control camshaft 126 is arranged to open a main intake valve 60 through a pushrod 136 and rocker arm 134 arrangement. As the control camshaft 126 rotates, the control cam 127 engages a lifter 138 and pushes the pushrod 136 up against the rocker arm 134. The rocker arm 134 pivots and pushes down on the intake valve 60 to open the intake valve 60 and hold it open. As shown in FIG. 5, the adjustable control camshaft 126 as shown in FIG. 5 has been adjusted by the cam phaser (not shown) to 0 degrees camshaft angle relative to the main camshaft 45, which is the position for full power output from the engine. Since both camshafts 45, 126 rotate at the same speed, and both cams 66, 127 are shown with the cam lobe tip pushing against the lifters 138, 139, the control cam 127 does not hold the intake valve 60 open for any longer than the duration that the main cam 45 holds the intake valve 60 open.

Figure 6:
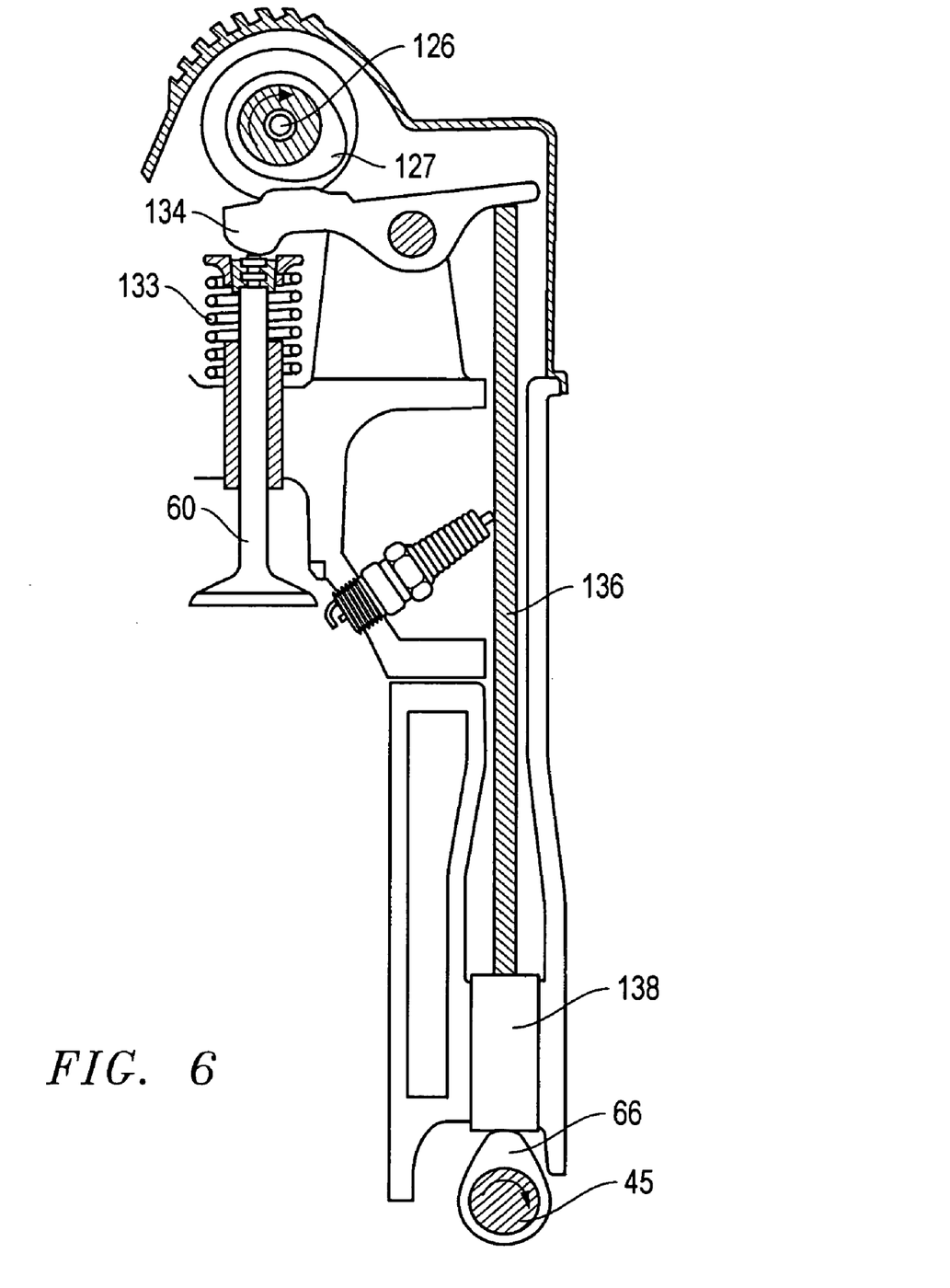
FIG. 6 is a cross-sectional view of a control camshaft alternatively arranged to extend the duration of opening of a main intake valve in accordance with the present invention.

FIG. 6 is a drawing of a cross-sectional view of a control camshaft alternatively arranged to operate a main intake valve in accordance with the present invention. In the embodiment of the invention shown, the main camshaft 45 is arranged and operates similarly to the arrangement shown in FIG. 5. The control camshaft 126, however, is shown in an arrangement having the control cam 127 pushing down on the rocker arm 134 to hold the intake valve 60 open. The adjustable control camshaft 126 as shown in FIG. 6 has been adjusted by the cam phaser (not shown) to retard the camshaft angle relative to the main camshaft 45, which is the position for less than full power output from the engine. Since both camshafts 45, 126 rotate at the same angular speed, as main cam 66 begins to rotate away from the lifter 138 that is holding the intake valve 60 open, the control cam 127 rotates against the rocker arm 134 to keep the intake valve 60 from closing when the pushrod 136 held up by the main cam 66 rolls away from fullest contact with the rocker arm 134. With the control cam 127 holding the intake valve 60 open during the initial portion of the compression stroke of the piston, a portion of the air or air/fuel charge is returned from the cylinder back into the intake manifold so that less than a full charge is compressed in the cylinder during the compression stroke.

It will be appreciated by those skilled in the art that different portions of the cam lobes provide different and customizable influence on valve positions and engine operation. For example, in the single intake valve engine adapted to use the present invention that is illustrated in FIG. 3B, the "rising" side of the control cam 127 has little or no function because the opening of the intake valve is always controlled by the main cam 66. Also, the "falling" side of the main cam 66 has little or no function because the closure of the intake valve is always controlled by the control cam 127. Therefore, there is no requirement that the cam profiles of the main cam 66 and the control cam 127 be identical and the cam profiles may be customized to optimize engine operation. Similarly, there is no requirement that the cam profiles of the main cam 66 and the control cam 127 of the dual intake valve engine of FIG. 3A be identical and these cam profiles may also be customized to optimize engine operation.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of controlling the power output of a spark-ignition internal combustion engine, comprising:
   receiving air into a cylinder during an intake stroke of a piston in the cylinder;
   returning at least about 5% by volume of the air from the cylinder during a compression stroke of the piston;
   compressing the remaining portion of the air from the cylinder during the remaining portion of the compression stroke of the piston;
   introducing a fuel to the cylinder; and
   igniting the compressed air and fuel mixture to drive the piston along its power stroke;
   wherein the engine is modulated to vary power output by control of the timing of an intake valve through which air enters the cylinder and not by the use of a throttle.

2. The method of claim 1, wherein the substantial portion of the air is at least about 10 vol. % of the air.

3. The method of claim 1, wherein the substantial portion of the air is at least about 20 vol. % of the air.

4. The method of claim 1, wherein the substantial portion of the air is less than about 95 vol. % of the air.

5. The method of claim 1, further comprising:
   mixing a fuel with the air to form an air/fuel mixture.

6. The method of claim 1, further comprising:
   reserving a desired quantity of the air within the cylinder for combustion by control of the timing of the intake valve closure and not by use of a throttle; and
   generating a desired power output.

7. The method of claim 1, further comprising:
   determining the desired quantity of air to reserve within a cylinder;
   opening an intake valve on the cylinder;
   reserving the desired quantity of air within the cylinder by control of the timing of the intake valve closure; and
   closing the intake valve.

8. The method of claim 7, further comprising:
   Varying the time interval between the steps of opening and of closing the intake valve to capture the desired quantity of air within the cylinder without using a throttle.

9. The method of claim 8, wherein the step of changing a duration between the steps of opening and of closing the intake valve further comprises:
   retarding a phase of a control camshaft relative to a main camshaft to increase the duration.

10. The method of claim 8, wherein the step of changing a duration further comprises:
    advancing a phase of a control camshaft relative to a main camshaft to decrease the duration.

11. The method of claim 1, wherein the air is received from and returned back into an intake manifold through the intake valve.

12. The method of claim 11, wherein the intake manifold operates between about one-half inch of Hg vacuum and about ambient atmospheric pressure.

13. The method of claim 11, wherein the intake manifold operates at a pressure higher than one inch of Hg vacuum.

14. The method of claim 13, further comprising:
    compressing the air/fuel mixture during a compression stroke of the piston.

15. The method of claim 14, further comprising:
    supplying the fuel through a carburetor.

16. The method of claim 14, further comprising:
    supplying the fuel through a fuel injector.

17. The method of claim 14, wherein the step of returning a substantial portion of the air further comprises returning the fuel mixed with the substantial portion of the air.

18. A method of controlling the power output of a spark-ignition internal combustion engine, comprising:
    receiving a signal indicating the desired power output;
    determining the desired quantity of air to be reserved within the cylinder to generate the desired power output;
    receiving the desired quantity of air through an intake manifold and an intake valve and into a cylinder;
    extending a duration for the intake valve to remain open;
    returning at least about 5% by volume of the desired quantity of air through the intake valve during the extended duration of opening; and
    compressing the remaining air in the cylinder to facilitate spark-ignited combustion, wherein the remaining air is a quantity of combustion air necessary for a desired power output; and
    wherein the engine is modulated to vary power output by control of the timing of the intake valve closure and not by the use of a throttle.

19. The method of claim 18, wherein the substantial portion is at least 20 vol. % of the charge of air.

20. The method of claim 18, further comprising:
    mixing a fuel with the charge of air.

21. The method of claim 18, wherein the intake manifold operates between about one-half inch of Hg vacuum and about ambient atmospheric pressure.

22. The method of claim 18, wherein the intake manifold operates at a pressure higher than one inch of Hg vacuum.

23. The method of claim 18, wherein the step of extending a duration for the intake valve to remain open farther comprises:
    retarding a phase of a control camshaft relative to a main camshaft.

24. The method of claim 23, further comprising:
    operatively engaging the control cam shaft with a cam phaser.

25. A control apparatus for controlling a power output of a spark-ignition internal combustion engine, the engine having a cylinder, a piston for reciprocating within the cylinder, a crankshaft connected to and rotated by the piston, a main intake valve for receiving air into the cylinder from an intake manifold during an inlet stroke of the piston, an exhaust valve for expelling combustion gases from the cylinder into an exhaust manifold, and a main camshaft rotatively connected to the crankshaft having a main cam for opening the main intake valve, the control apparatus comprising:
    a control camshaft rotatively connected to the crankshaft comprising a control cam that engages the main intake valve for holding the main intake valve open for return of at least 5% by volume of the air to the intake manifold; and
    a cam phaser operatively engaging the control camshaft to change a phase of the control cam between about 0 degrees and about 90 degrees of control camshaft angle relative to the main camshaft;
    wherein modulation of the power output of the engine is by control of the timing of the closure of the main intake valve and not by use of a throttle.

26. The control apparatus of claim 25, wherein the control camshaft rotates at the same speed as the main camshaft.

27. The control apparatus of claim 25, further comprising:
a belt, a chain or a gear rotatively coupling the control camshaft to the crankshaft for rotatively driving the control camshaft at a speed of approximately one-half the crankshaft speed.

28. The control apparatus of claim 25, wherein the cam phaser is powered by hydraulic, electrical or mechanical arrangements.

29. The control apparatus of claim 25, wherein the phase of the control cam is 0 degrees, the control cam and the main cam essentially simultaneously engage and disengage from the intake valve.

30. The control apparatus of claim 25, wherein the phase of the control cam is greater than 0 degrees, the control cam holds the intake valve open for a duration after the main cam disengages from the intake valve.

31. The control apparatus of claim 25, further comprising:
a cam phaser controller controllably linked to the cam phaser, wherein retarding the phase of the control cam decreases the power output of the internal combustion engine.

32. The control apparatus of claim 31, wherein the cam phaser controller comprises:
an accelerator connected through a mechanical linkage to the cam phaser, wherein pushing the accelerator activates the cam phaser through the mechanical linkage to advance the phase of the control cam.

33. The control apparatus of claim 31, wherein the cam phaser controller comprises:
an accelerator in electrical communication with an on-board computer, wherein pushing the accelerator signals the computer to send a control signal to the cam phaser to advance the phase of the control cam.

34. A control apparatus for controlling a power output of a spark-ignition internal combustion engine, the engine having a cylinder, a piston for reciprocating within the cylinder, a crankshaft connected to and rotated by the piston, a main intake valve for receiving air into the cylinder from an intake manifold during an inlet stroke of the piston, an exhaust valve for expelling combustion gases from the cylinder into an exhaust manifold, and a main camshaft rotatively coupled to the crankshaft having a main cam for opening the main intake valve, the control apparatus comprising:
a control intake valve for receiving air into the cylinder from an intake manifold;
a control camshaft rotatively coupled to the crankshaft comprising a control cam that engages the control intake valve for opening and holding the control intake valve open for return of at least 5% by volume of the intake air to the intake manifold; and
a cam phaser operatively engaging the control camshaft to retard a phase of the control cam between about 0 degrees and about 90 degrees of control camshaft angle relative to the main camshaft;
wherein the output power of the engine is modulated by control of the timing of the closure of the control intake valve and not by use of a throttle.

35. The control apparatus of claim 34, wherein the control camshaft rotates at the same speed as the main camshaft.

36. The control apparatus of claim 34, further comprising:
a belt, a chain or a gear rotatively coupled the control camshaft to the crankshaft for rotatively driving the control camshaft at a speed of approximately one-half the crankshaft speed.

37. The control apparatus of claim 34, wherein the cam phaser is powered by hydraulic, electrical or mechanical arrangements.

38. The control apparatus of claim 34, wherein the phase of the control cam is 0 degrees, the control cam engages and disengages from the control intake valve essentially simultaneously as the main cam engages and disengages from the main intake valve.

39. The control apparatus of claim 34, wherein the phase of the control cam is greater than 0 degrees, the control cam engages the control intake valve after the main cam engages the main intake valve and the control cam disengages from the control intake valve after the main cam disengages from the main intake valve.

40. The control apparatus of claim 34, further comprising:
a cam phase controller controllably linked to the cam phaser, wherein retarding the phase of the control cam decreases the power output of the internal combustion engine.

41. The control apparatus of claim 40, wherein the cam phaser controller comprises:
an accelerator connected through a mechanical linkage to the cam phaser, wherein pushing the accelerator activates the cam phaser through the mechanical linkage to advance the phase of the control cam.

42. The control apparatus of claim 40, wherein the cam phaser controller further comprises:
an accelerator in electrical communication with an on-board computer, wherein pushing the accelerator signals the computer to send a control signal to the cam phaser to advance the phase of the control cam according to a determined desired quantity of air to be returned from the full charge of air received into the cylinder.

* * * * *